(12) United States Patent
Dippel et al.

(10) Patent No.: US 11,845,833 B2
(45) Date of Patent: Dec. 19, 2023

(54) METHOD FOR FORMING THERMOPLASTIC ADDITIVE MANUFACTURING POWDERS

(71) Applicant: Jabil Inc., St. Petersburg, FL (US)

(72) Inventors: Nicholas John Dippel, Burnsville, MN (US); Steven Kubiak, Edina, MN (US); Zachary Peterson, New Hope, MN (US); Mathew Artin Torosian, Highlands Ranch, CO (US); John Gordon Eue, St. Louis Park, MN (US); Thomas Fry, Victoria, MN (US)

(73) Assignee: Jabil Inc., St. Petersburg, FL (US)

( * ) Notice: Subject to any disclaimer, the term of this patent is extended or adjusted under 35 U.S.C. 154(b) by 0 days.

(21) Appl. No.: 17/745,219

(22) Filed: May 16, 2022

(65) Prior Publication Data

US 2022/0380565 A1    Dec. 1, 2022

Related U.S. Application Data

(60) Provisional application No. 63/217,451, filed on Jul. 1, 2021, provisional application No. 63/189,609, filed on May 17, 2021.

(51) Int. Cl.
*B29B 9/02*      (2006.01)
*C08G 67/02*    (2006.01)
(Continued)

(52) U.S. Cl.
CPC ............... *C08G 67/02* (2013.01); *B29B 9/02* (2013.01); *B29C 64/314* (2017.08); *B33Y 40/10* (2020.01);
(Continued)

(58) Field of Classification Search
CPC .... C08G 67/02; C08G 2150/20; B33Y 70/00; B33Y 40/10; B29C 64/314; B29B 9/02;
(Continued)

(56) References Cited

U.S. PATENT DOCUMENTS 3,065,205 A    11/1962 Bonner, Jr.
3,179,631 A    4/1965 Endry
(Continued)

FOREIGN PATENT DOCUMENTS

CN    110655666 A    1/2020
EP    0431924 A2    6/1991
(Continued)

OTHER PUBLICATIONS

Text of WO 2021137086 by Solenicki. (Year: 2021).*
(Continued)

*Primary Examiner* — Michael M Dollinger
*Assistant Examiner* — Christina H. W. Rosebach
(74) *Attorney, Agent, or Firm* — Young Basile Hanlon & MacFarlane, P.C.

(57) ABSTRACT

Useful thermoplastic polymer powders are formed by a method comprising: cooling a foam comprised of a thermoplastic foam below the brittleness temperature of the thermoplastic polymer, wherein the foam has an average strut dimension of 10 to 500 micrometers, and comminuting the cooled foam to form a thermoplastic polymer powder. The method allows for the efficient grinding of the thermoplastic polymer having improved morphology and desirable characteristics such as dry flow without flow aids.

20 Claims, 4 Drawing Sheets

(51) Int. Cl.
  *B33Y 70/00* (2020.01)
  *B29C 64/314* (2017.01)
  *B33Y 40/10* (2020.01)
  *C09D 5/03* (2006.01)
  *C09D 173/00* (2006.01)
  *C08J 9/00* (2006.01)
  *C08J 9/36* (2006.01)
  *B29K 61/00* (2006.01)

(52) U.S. Cl.
  CPC .............. *B33Y 70/00* (2014.12); *C08J 9/0004* (2013.01); *C08J 9/36* (2013.01); *C09D 5/031* (2013.01); *C09D 173/00* (2013.01); *B29K 2061/00* (2013.01); *B29K 2995/004* (2013.01); *C08G 2150/20* (2013.01); *C08J 2361/02* (2013.01)

(58) Field of Classification Search
  CPC ........ C08J 9/0004; C08J 9/36; C08J 2361/02; C09D 5/031; C09D 173/00; B29K 2061/00; B29K 2995/004; C08D 5/031
  See application file for complete search history.

(56) References Cited

U.S. PATENT DOCUMENTS

| | | | |
|---|---|---|---|
| 3,214,407 A | 10/1965 | Butterworth | |
| 3,249,588 A | 5/1966 | Gall | |
| 3,441,538 A | 4/1969 | Marks | |
| 3,442,857 A | 5/1969 | Thornton | |
| 3,516,966 A | 6/1970 | Berr | |
| 4,704,448 A | 11/1987 | Brugel | |
| 4,755,555 A | 7/1988 | Manwiller et al. | |
| 4,816,556 A | 3/1989 | Gay et al. | |
| 4,824,720 A | 4/1989 | Malone | |
| 4,835,250 A | 5/1989 | Drent | |
| 4,853,462 A | 8/1989 | Hostetler et al. | |
| 4,894,435 A | 1/1990 | Drent | |
| 5,138,032 A | 8/1992 | Mastenbroek et al. | |
| 5,391,640 A | 2/1995 | Akkapeddi et al. | |
| 5,395,055 A | 3/1995 | Shutov et al. | |
| 5,597,589 A | 1/1997 | Deckard | |
| 5,670,102 A * | 9/1997 | Perman ............... | B29C 44/3453 264/53 |
| 5,977,231 A | 11/1999 | Ash | |
| 6,136,948 A | 10/2000 | Dickens, Jr. et al. | |
| 6,177,518 B1 | 1/2001 | Lahijani | |
| 6,213,540 B1 | 4/2001 | Tusim et al. | |
| 6,284,810 B1 | 9/2001 | Burnham et al. | |
| 7,267,534 B2 | 9/2007 | Xu | |
| 10,364,349 B1 | 7/2019 | Bertelo et al. | |
| 10,479,733 B2 | 11/2019 | Diekmann et al. | |
| 2003/0181538 A1 | 9/2003 | Martel et al. | |
| 2005/0276967 A1 | 12/2005 | Prasad | |
| 2008/0058494 A1 | 3/2008 | Shim et al. | |
| 2012/0077010 A1* | 3/2012 | Manesis ..................... | B32B 5/26 428/220 |
| 2012/0114848 A1 | 5/2012 | M ller et al. | |
| 2013/0323416 A1 | 12/2013 | Bertelo et al. | |
| 2015/0011815 A1 | 1/2015 | Ma et al. | |
| 2017/0282430 A1 | 10/2017 | Baldwin et al. | |
| 2017/0326790 A1 | 11/2017 | Lee et al. | |
| 2018/0200922 A1* | 7/2018 | DeFelice ................ | C08G 65/46 |
| 2020/0247012 A1* | 8/2020 | DeFelice ................... | B29B 9/06 |
| 2021/0277180 A1 | 9/2021 | Gardner et al. | |
| 2021/0277192 A1 | 9/2021 | Gardner et al. | |

FOREIGN PATENT DOCUMENTS

| | | |
|---|---|---|
| KR | 10-2016-0108820 A | 9/2016 |
| WO | 199606881 A2 | 3/1996 |
| WO | 199618686 A1 | 6/1996 |
| WO | 200138061 A1 | 5/2001 |
| WO | 2017033146 A1 | 3/2017 |

OTHER PUBLICATIONS

Chen, Y. et al. Effects of cell Size and Cell Wall Thickness Variations on the Strength of Closed-Cell Foams using LaGuerre Tesselation. 21st International Conference on Composite Materials. Aug. 2017. (Year: 2017).*

Maloo, L.M. et al. A Sneak Peek Toward Polyaryletherketone (PAEK) Polymer: A review.(Nov. 3, 2022) A Sneak Peek Toward Polyaryletherketone (PAEK) Polymer: A Review. Cureus 14(11): e31042. DOI 10.7759/cureus.31042 (Year: 2022).*

Schmid, M. et al. Materials perspective of polymers for additive manufacturing with selective laser sintering. J. Mater. Res., vol. 29, No. 17, Sep. 14, 2014 (Year: 2014).*

Migliore, Nicola et al., "Effect of the Polyketone Aromatic Pendent Groups on the Electrical Conductivity of the Derived MWCNTs-Based Nanocomposities . . . " Polymers 2018, 10, 618; doi: 10.3390/polym10060618 (16 pages).

Toncelli, Claudio, "Functional Polymers from Alternating Aliphatic Polyketones: Synthesis and Applications." Publication date 2013, University of Groningen (136 pages).

"Hydrocerol and Colormatrix Excelite Chemical Foaming Additives." Product Selection Guide, Avient (6 pages).

Altan, M., "Thermoplastic Foams: Processing, Manufacturing, and Characterization." DOI: 10.5772/intechopen.71083. (23 pages).

Bhamidipati, M., MS et al., "The Future of Carbon Dioxide for Polymer Processing in Tissue Engineering." Tissue Engineering: Part B, vol. 19, No. 3, 2013. DOI: 10.1089/ten.teb.2012.0361. (12 pages).

Gendron, R. et al., "Supercritical Fluids in Thermoplastics Foaming: Facts or Fallacies?" Rapra Technology, 2006, Cellular Polymers. vol. 25, No. 4, 2006 (24 pages).

Jimenez, J. et al., "Foaming of PLA Composites by Supercritical Fluid-Assisted Processes: A Review." Molecules 2020, 25, 3408; doi: 10.3390/molecule25153408 (39 pages).

Jin, Fan-Long et al., "Recent Trends of Foaming in Polymer Processing: A Review." Polymers 2019, 11, 953; DOI: 10.3390/polym11060953 (23 pages).

Nalawade, S. et al., "Supercritical carbon dioxide as a green solvent for processing polymer melts: Processing aspects and applications." Prog. Polym. Sci. 31 (2006) 19-43 (25 pages).

Olson, Eric, "Particle Shape Factors and Their Use in Image Analysis Part II: Practical Applications." Journal of GXP Compliance, Autumn 2011 vol. 15 No. 4 (13 pages).

Sauceau, M. et al., "New challenges in polymer foaming: A review of extrusion processes assisted by supercritical carbon dioxide." Progress in Polymer Science, (2011) 36: 749-766 (30 pages).

Sichina, W.J., "Measurement of Tg by DSC." Perkin Elmer™ instruments. 2000 PerkinElmer, Inc., PETech-09 Thermal Analysis (5 pages).

Chen, Youming et al., "Effects of Cell Size and Cell Wall Thickness Variations on the Strength of Closed-Cell Foams Using Laguerre Tessellation." 21st International Conference on Composite Materials, Aug. 2017 (15 pages).

Groenewoud, Wim et al., "Characterization of Polyketone Copolymer by High Speed DSC." Application Note; PerkinElmer product information (6 pages).

International Search Report and Written Opinion in co-pending International Application PCT/US2022/029422 dated Jul. 25, 2022 (20 pages).

Klop, E.A., et al., "Polymorphism in alternative polyketones studied by x-ray diffraction and calorimetry." Jouronal of Polymer Science Part B: Polymer Physics / vol. 33, Issue 2. (2 pages).

Naitove, Matthew, "A Rate 'Resurrection' in Engineering Plastics." Plastics Technology, Published Oct. 27, 2014.

Wikipedia: Polyketone definition (4 pages).

International Search Report and Written Opinion in co-pending application PCT/US2022/029424 dated Sep. 1, 2022 (14 pages).

Database WPI Week 202001, Thomson Scientific, Long, GB; AN 2020-05446X.

* cited by examiner

METHOD FOR FORMING THERMOPLASTIC ADDITIVE MANUFACTURING POWDERS

CROSS-REFERENCE TO RELATED APPLICATION(S)

This application claims priority to and the benefit of U.S. Provisional Application Patent Ser. Nos. 63/189,609, filed May 17, 2021, and 63/217,451, filed Jul. 1, 2021, the entire disclosure of each of these is hereby incorporated by reference.

TECHNICAL FIELD

This disclosure relates to a method of forming thermoplastic powders useful for additive manufacturing.

BACKGROUND

Powder-based methods of additive manufacturing include the following. Selective laser sintering (SLS) is a 3D-printing technique that uses a laser to fuse powder material in successive layers (see, for example, U.S. Pat. No. 5,597,589). High-speed sintering (HSS) and multi-jet fusion (MJF) 3D-printing employ multiple jets that similarly deposit successive layers of infrared-absorbing (IR-absorbing) ink onto powder material, followed by exposure to IR energy for selective melting of the powder layer. Electrophotographic 3D-printing employs a rotating photoconductor that builds the object layer-by-layer from the base.

Selective laser sintering (SLS), multi-jet fusion (MJF), and high-speed sintering (HSS) 3D-printing methods use the same type of free-floating, non-fixed powder bed where each successive layer of powder is metered out requiring a dry flow of the power to ensure good part integrity. They generally have the same material requirements for compatibility with the printing process since the additively built object will experience similar stresses, only with different heating mechanisms to obtain the melt phase. Typically, a free-body diagram of a 3D printed object can be used to determine the residual stresses expected in the printed object. This is necessary for successfully building the object. If the residual stress is too high or the powder does not flow adequately, the object will deform or have unacceptable defects.

The residual stresses have typically been minimized for these powder bed-based 3D printers by using crystalline or semicrystalline thermoplastic polymers having sufficiently large window between its melting temperature and its recrystallization temperature. Unfortunately, this has limited the polymers that have successfully used to print large or complex parts using SLS and MJF methods (e.g., polyamides), thus limiting the use of these additive manufacturing methods. Likewise, the use of semi-crystalline polymers upon recrystallization after heating to make the additive manufactured article may limit the properties articles.

There have been examples of induced crystallization of polymers such as polycarbonate as described in U.S. Pat. Nos. 3,214,407 and 4,853,462; U.S. Pat. Publ. No. 2021/0277180, and PCT Pub. No. WO 2017/033146. These all used volatile organic solvents and the separation of the powder from solvent (e.g., precipitation) to form powders having induced crystallization. Unfortunately, the use of these solvents may limit the use of such polymer articles, for example, those requiring food contact.

Generally, to realize the necessary particle size allowing the melting and fusion of the powders into adhered successive layers has required the cryogrinding and classification of the polymers. Cryogrinding unfortunately is an energy intensive and laborious process. Likewise, the grinding process tends, due to brittle fracture of the polymer masses result in powders having angular asperities as well as excessive fine particles may be formed that must be heated and reprocessed. Because of the particulate angularity arising from the milling and presence of fine particles the flow and distribution of the particles may result in defects in the manufactured articles. As a result, flow aids have been necessary in many instances to allow the dry metering of the powder with the required uniformity to realize defect free undeformed additive manufactured parts.

Accordingly, it would be desirable to provide a method that avoids one or more problems to make polymeric powders useful for additive manufacturing such as SLS, HSS, MJF and the like. For example, it would be desirable to provide a method that is more efficient to realize useful additive manufacturing powders that may not require flow aids.

SUMMARY

Applicant has discovered a method that allows for the tailoring of the particle size, size distribution and particle morphology and is more efficient that previous methods for making thermoplastic polymeric powders useful for additive manufacturing. The method involves forming a polymeric foam (porous polymeric body) that have particular microstructural characteristics that allow for the efficient milling and realization of the useful powder particle size, size distribution and microstructure. It has been discovered that foams (porous thermoplastic polymer bodies) having a strut or cell wall minimum thickness that is larger than the desired minimum particle may be comminuted more efficiently and with less undesired small particles. The foams may be made at ambient temperatures or elevated temperatures with the pores or cells of the foam desirably having an average size that is less than the average strut or cell walls size. Typically, the foams having a porosity of about 2% to 50% to realize the desired characteristics and efficient grinding to form the polymer powder.

The thermoplastic polymer additive manufacturing powder may be made by a method comprising, cooling a foam comprised of a thermoplastic foam below the brittleness temperature of the thermoplastic polymer, wherein the foam has an average strut dimension of 10 to 500 micrometers, and comminuting the cooled foam to form a thermoplastic polymer powder.

The thermoplastic polymer powders formed by the method hereunder may be sintered or fused by application of directed heat or electromagnetic energy to make additive manufactured articles.

DETAILED DESCRIPTION

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Surprisingly, the method may be performed at temperatures (i.e., cooling temperature) substantially above the brittleness temperature. For example, the temperature may be any temperature below the glass transition temperature of the particular polymer and desirably above the brittleness temperature. The glass transition temperature (Tg) may be determined by any known method such as those known in the art such as differential scanning calorimetry (DSC), dynamic mechanical analysis (DMA), and thermomechanical analysis analysis (TMA). Illustratively, the Tg may be determined by DSC from the deviation from linear of the heating curve (heating rate of 20° C./minute) using ASTMD3418 or ISO 11357-2 where Tg is the midpoint of the deviation such which is further illustrated by W. J. Sichina in "*Measurement of Tg by DSC*", PETech-09, Thermal Analysis, PerkinElmer, Inc., 2000. Whereas when a dense polymer is used, the comminution almost invariably requires a temperature very near (within ~5% of the brittleness temperature as given in Kelvin) or below the brittleness temperature. Improved shape may arise from the use of milling at a temperature above the brittleness temperature to Tg and improved morphology may be realized at cooling temperatures close to Tg such as within 25%, 20% or 10% of Tg as given in Kelvin. However, a lower cooling temperature near the brittleness temperature (e.g., within 20% or 10% of the brittleness temperature may improve milling efficiency). The method typically comprises cooling of a thermoplastic polymer below glass transition temperature to its brittleness temperature. Brittleness temperature is as defined in ASTM D746 or ISO 974. The temperature may be further below the brittleness temperature. The cooling may be by any suitable such as those known in the art of cryomilling. Illustratively, the cooling may be refrigeration or exposure to dry ice or liquid nitrogen. The temperature of cryomilling may be any suitable temperature depending on the particular thermoplastic polymer and its glass transition temperature and brittleness temperature. Typical temperatures be any temperature below or equal to 40° C., 20° C., 0° C., −25° C., −50° C. to about −75° C., −100° C., −150° C., or −190° C.

The thermoplastic polymer may be any thermoplastic polymer that may be used to make additive manufacturing articles by a floating bed 3D printing method such as selective laser sintering (SLS) as described, for example, by U.S. Pat. No. 6,136,948 and WO 96/06881. The thermoplastic polymers may also be useful for producing articles by the SIB process (selective inhibition of bonding of powder), as described in WO 01/38061, via 3D printing, as described in EP 0 431 924, or via a microwave process, as described in U.S. Pat. No. 10,479,733.

Illustrative thermoplastic polymers include, but are not limited to, polyamides, polyesters, polycarbonates, polyketones, polysulfones, polyarylates, polyimides, polyolefins, polystyrene, polyesters, copolymers of the aforementioned and blends of the aforementioned. The thermoplastic polymer may be linear or branched. The thermoplastic polymer may be aliphatic or aromatic. It may be desirable for the thermoplastic polymer to have at least a portion of said polymer comprised of repeating aromatic units within the polymer backbone. Illustratively the thermoplastic polymer may have 5%, 10%, 25% or 50% by mole of the polymer to be aromatic (e.g., the aromatic groups make up 50% or more of the molar mass of the polymer).

The thermoplastic polymer generally is comprised of a semicrystalline polymer, where the semi-crystalline polymer displays at least about 5% crystallinity to essentially fully crystalline when heating and cooled at rates commonly experienced when forming or compounding such polymers (e.g., heating and cooling rates from ambient temperature ~25° C. to the melting temperature). That is, the polymer displays crystallinity without forced crystallization methods such as those known in the art (e.g., solvent induced crystallization and the like). Generally, the amount of crystallinity is at least about 5%, 10%, 15% or 20% to about 95%, 75%, 50% or 30%. The crystallinity may be determined by any suitable methods such as those known in the art. Illustratively, the percent crystallinity may be determined by x-ray diffraction including, for example, wide angle x-ray diffraction (WAXD), such as by using a Rigaku SmartLab x-ray diffractometer, or by differential scanning calorimetry (DSC), such as by using a TA Instruments DSC250 differential scanning calorimeter employing ASTM D3418-15, wherein when determining crystallinity by differential scanning calorimetry (DSC) a heating or cooling rate of 20° C./min is used unless otherwise specified. The $T_m$ and $T_c$ (melting temperature and crystallization temperature) is determined from the melt/crystallization peak of the DSC as described by ASTM D3418 using the midpoint of the peak. The onset of the $T_m$ and $T_c$ peaks likewise are determined as per ASTM D3418 or ISO 11357-2 (i.e., deviation of the scan from linear).

Semicrystalline, herein, is inclusive of amorphous thermoplastic polymers having induced crystallinity that then revert to amorphous upon heating above its melt temperature, such as described in copending U.S. application No. 63/289,465, incorporated herein by reference.

Examples of useful polycarbonates include those described in paragraphs 49 to 56 of U.S. Pat. Publ. No. 2021/0277192, incorporated herein by reference.

Examples of useful polysulfones may include polyarylethersulfones (PAES) which may be represented by:

wherein n is any integer value that gives rise to the PAES having an weight average molecular weight (Mw) anywhere from 1, 10, or 20 to 1000, 500 or 200 kDa, m typically varies from 0 to 10, each occurrence of R1 represents an aromatic ring or fused rings of about 5-10 carbon atoms, such as but not limited to: 1,2-, 1,3-, or 1,4-phenylene, or a diphenylene such as but not limited to 4,4'-diphenylene, and each occurrence of R2 is independently C1-C20 alkyl, C5-C18 or C5-C12 aromatic ring or fused rings consisting of 5-10 carbon atoms, or a combination thereof. The fragment structure —R1-S(=O)2-R1- may also represent either of the fused heterocyclic ring structures shown in formulas 2 and 3; and wherein at least 60% of the total number of R1 groups are aromatic, or each $R_2$ contains at least one C6-30 aromatic group. The fragment structure —R1-S(=O)2-R1- may also represent either of the fused heterocyclic ring structures shown in formulas 2 and 3:

In an embodiment $R^1$ and $R^2$ may be the residue of an aryl or diaryl compound:

In another embodiment, the PAES of formula (1), m has an integer value greater than or equal to zero (typically from 1 to 10, 6, 5, 4, 3, or 2), and each $R^2$ is a residue of a dihydroxy compound such as an aromatic dihydroxy compound:

In formulas (3), (4), and (5), each $R^3$, $R^4$, and $R^5$ is independently, for example, but not limited to: a halogen atom (e.g., chlorine or bromine), a $C_{3-20}$ alkoxy, a $C_{1-20}$ hydrocarbyl group (e.g., a $C_{1-20}$ alkyl, a halogen-substituted $C_{1-10}$ alkyl, a $C_{6-10}$ aryl, or a halogen-substituted $C_{6-10}$ aryl); and p, q, and r are each independently integers of 0 to 4, such that when p, q, or r is less than 4, the valence of each unsubstituted carbon of the ring is filled by hydrogen; and X represents a bridging group connecting the two phenolic groups, where the bridging group and the hydroxy substituent of each $C_6$ arylene group are disposed ortho, meta, or para (preferably para) to each other on the $C_6$ arylene group, and the X group consists of, for example: a single bond; —O—; —S—; —S(=O)—; —S(=O)$_2$— (e.g., bisphenol-S); —C(=O)—; or a $C_{1-20}$ organic group, which can be cyclic or acyclic, aromatic or non-aromatic, and can further comprise heteroatoms such as: halogens; oxygen; nitrogen; sulfur; silicon; or phosphorous.

Specific dihydroxy compounds include but are not limited to: resorcinol; 2,2-bis(4-hydroxyphenyl)propane ("bisphenol A" or "BPA", in which in which each of aryl rings is para-substituted and X is isopropylidene in formula (3)); 3,3-bis(4-hydroxyphenyl)phthalimidine; 2-phenyl-3,3-bis(4-hydroxyphenyl)phthalimidine (also known as "N-phenyl phenolphthalein bisphenol", "PPPBP", or 3,3-bis(4-hydroxyphenyl)-2-phenylisoindolin-1-one); 1,1-bis(4-hydroxy-3-methylphenyl)cyclohexane; 1,1-bis(4-hydroxy-3-methylphenyl)-3,3,5-trimethylcyclohexane (also known as "isophorone bisphenol").

Examples of polyarylethersulfones that are suitable may any one or more of:

Examples of useful PAES polymers are: polyethersulfone (PSU, CAS #25667-42, formula 7), poly(1,4-phenylene-ether-ether-sulfone (PES or PEES, CAS #28212-68-2, formula 8), polyphenylenesulfone (PPSU, CAS #25839-81-0, formula 9) and poly(bisphenol-A sulfone) (PSF, CAS #25135-51-7, formula 10), such as are available under the tradenames RADEL from Curbel Plastics Inc., Arlington Tex., PARYLS from UJU New Materials, Ltd., and UDEL from Solvay Specialty Polymers USA, LLC, Alpharetta, Ga.

The crystallizable polymer may be polyketone including polyketones having ether repeating units such as polyetherketone, polyetheretherketone, polyetherketoneketone. An exemplary polyketone without ether repeating units may be formed by the reaction of carbon monoxide, an alkene monomer in the presence of a group 8 to 10 transition metal catalyst. In particular, the method may be any one of those described in U.S. Pat. Nos. 4,835,250; 4,894,435 and 5,138,032 and US Pat. Publ. No. 2008/0058494 each incorporated by reference in its entirety. In particular, the method, reaction conditions and monomers are those described in U.S. Pat. No. 5,138,032 from col. 2 line 52 to col. 5, line 17 specifically incorporated herein by reference. Such polyketones are typically comprised of repeating units represented by where A is the residue of an alkene monomer converted to a saturated hydrocarbon group, m is from about 1 to 6 and n is at least about 2 to any practicable amount to realize the desired number average molecular weight (Mn) useful in the invention. Desirably, the alkene monomer is comprised of an olefin having from 2 to 12, 8 or 6 carbons. Illustratively, the alkene monomer is ethylene or the alkene monomer comprises ethylene and at least one other olefin monomer such as propylene. When the polyketone is a copolymer of ethylene and another olefin monomer (e.g., propylene), the amount of ethylene and other olefin is as described in U.S. Pat. No. 5,138,032 from col. 2, line 17 to col. 3, line 14. The polyketone desirably is one that is a terpolymer of carbon monoxide, ethylene and another alkene monomer (e.g., olefin of 3 to 12, 8 or 6 carbons and in particular propylene). Such polyketone may be represented by random repeating units:

where G is the saturated residue of an olefin of 3 to 12, 8 or 6 carbons polymerized through the double bond and x/y is at least 2 to 100 or 50 or 20. Desirably, G is propylene. The polyketone may be terminated by any useful group such as alkyl group, hydroxyl, ester, carboxylic acid, ether or combination thereof. The particular terminating group may arise from using a solvent such as a low molecular alcohol such as methanol or water or combination thereof. Examples of commercially available polyketones include those available under the tradename POKETONE from Hyosung, Korea.

Generally, the polyketone may be a polyaryletherketone (PAES) such as those known in the art. Illustratively, the PAES may be polyetherketoneketone (PEKK) such as those known in the art and in particular amorphous PEKK as described from col. 2, line 13 to 55 of U.S. Pat. No. 10,364,349, incorporated herein by reference. PEKKs may be made by known methods such as those described in U.S. Pat. Nos. 3,065,205; 3,441,538; 3,442,857; 3,516,966; 4,704,448; 4,816,556 and 6,177,518.

The polyamide may be any of those known in the art and and commonly are semi-crystalline as described from col. 4, line 7 to col. 5, line 22 of U.S. Pat. No. 5,391,640, incorporated herein by reference. In particular, the polyamide may be amorphous as described from col. 5, line 23 to col. 8, line 12 of U.S. Pat. No. 5,391,640, incorporated herein by reference. Examples of conventional polyamides include polypyrrolidone (nylon 4), polycaprolactam (nylon 6), polyheptanolactam (nylon 7), polycaprylactam (nylon 8), polynonanolactam (nylon 9), polyundecaneolactam (nylon 11), polydodecanolactam (nylon 12), poly(tert-ramethylene-diamine-co-oxalic acid) (nylon 4,2), poly(-tetramethylene-diamine-co-adipic acid) (nylon 4,6), poly(tetramethylenediamine-co-isophthalic acid) (nylon 4,1), polyhexamethylene azelaiamide (nylon 6,9), polyhexamethylene sebacamide (nylon 6,10), polyhexa-5 methylene isophthalamide (nylon 6,IP), polymetaxyly-lene adipamide (nylon MXD6), the polyamide of n-dodecanedioic acid and hexamethylenediamine (nylon 6,12), the polyamide of dodecamethylenediamine and n-dodecanedioic acid (nylon 12,12), as well as copoly-10 mers thereof which include: hexamethylene adipamide-caprolactam (nylon 6,6/6), hexamethylene adipamide/-hexamethylene-isophthalamide (nylon 6,6/6IP), hexa-methylene adipamide/hexamethylene-terephthalamide (nylon 6,6/6T), trimethylene adipamide-hexamethy-15 lene-azelaicamide (nylon trimethyl 6,2/6,2), and hexa-methylene adipamide-hexamethylene-azelaicamide caprolactam (nylon 6,6/6,9/6) as well as others which are not particularly delineated here.

The polyimide may be any of those known in the art and desirably are known aromatic polyimides. Illustratively, Aromatic polyimides that may be suitable are described in U.S. Pat. Nos. 3,179,631; 3,249,588 and 4,755,555, each incorporated herein by reference.

The thermoplastic foam is one that has an average strut or cell wall thickness that ranges from 10 to 500 micrometers. The average strut or cell thickness may be determined using micrograph of a cross-section of the foam using any suitable technique such as optical microscopy or scanning electron microscopy of a cut or fractured cross-section, which may be resin filled as necessary. The average strut or cell wall thickness may be determined by measuring the wall thickness of least about 25 randomly selected walls on one or more, 100× micrographs of an area of about 2 mm$^2$ of a cross-section of the foam. Desirably, the average strut dimension is at least 20, 30 or 50 micrometers to 400, 300 or 250 micrometers.

Desirably, the strut or cell wall thickness has a distribution that realizes the desired flow without a flow aid as described below. Generally, it is desirable for the D10 strut dimension to be at least 1, 5 or 10 micrometers. The D10 strut dimension is one where at least 90% of the struts have a size greater than the D10 dimension as determined herein. Likewise, it is desirable for the D90 strut dimension to be at most about 1 mm, 750 micrometer or 500 micrometers.

The foam also desirably has as low a porosity while achieving the desired strut dimension, which, without being limiting, is believed to facilitate the efficiency of grinding the thermoplastic polymer to form the form the thermoplastic polymer powder useful for additive manufacturing. Illustratively, the porosity may be at least 2%, 5%, 10% to at most 70%, 60% or 50%. The porosity may be determined by any suitable method such as those known in the art such as by mercury, helium pycnometry or Archimedes method (for low porosity; Method A ISO 18754:2020) or by determining the mass and volume of the foam, which may be facilitated by coating irregular foams to seal off open porosity and determining the volume by liquid displacement. The porosity of the foam may open or closed, but desirably is comprised of open porosity. Illustratively, at least 5%, 10%, 25%, 50%, 75%, 90% or essentially all of the porosity is open porosity.

The size of the pore cells may be any so long as the strut dimension is as described herein. But, it may be advantageous to have the cell pore size to be smaller than the strut dimension. The average cell size, for example, may be 10%, 20% or 50% smaller than the average strut dimension. The pore size may be determined micrographically in a manner akin to that for determining the strut dimension or a mercury intrusion pycnometer may be used.

The cross-sectional shape of the foam that is formed may be any that is useful and is not limited. For example, the foam may be a spherule, symmetrical or asymmetrical bead, fiber (chopped), pellet, platelet, cut sheet, cut rod and tube of any cross-sectional shape and the like. The foam may be of any useful size for comminuting. The size of the foam may be any useful for comminuting to the desired thermoplastic polymer powder. Illustratively, the having an average particle size from 0.5 mm to 50 mm equivalent spherical diameter. The foam may be larger than this initially and may be reduced in size prior to comminuting by known methods such as cutting an extruded foam by known cutters such wire cutters or saws. The foam may be spherical, symmetrical or asymmetrical such as any one of the shapes described above. Typically, the foam to be comminuted has an equivalent spherical diameter of about 0.5 mm to 50, 25 or 10 mm equivalent spherical diameter. The aspect ratio of the foam prior comminuting may have an aspect ratio of 1 or greater, 1.5, 2 to 50, 75 or 100. The aspect ratio may be measured from a micrograph of the longest and shortest axis of randomly selected foam particles (~100) using commonly available digital vision software or manually by known methods.

The thermoplastic polymer foam may be made by any suitable method such as those known in the art. The method may be any that utilizes a blowing agent or using mechanically induced frothing. The foaming desirably is realized by the fusing of polymer particles such as when precipitating from a solvent when polymerizing to form the polymer or upon dissolution and induction of precipitation by any suitable method such as those known in the art. It has been discovered these foams (porous bodies) are particularly suited in the present method and lead to desirable characteristics of dry particle flow without the use of a flow aid. That is, the powders without the addition of any flow aid may have a flowability (flow rate) of at least about 0.5 g/s, 1 g/s or 2 g/s to any practically achievable rate (e.g., 50 g/s) using a 15-mm nozzle as determined by Method A of ASTM D 1895.

The foam or porous body having the requisite characteristics may be illustrated by the polymerization of polymer precipitating from reaction medium such as described by U.S. Pat. No. 5,138,032 from col. 2, line 17 to col. 3, line 14, incorporated herein by reference.

The foam may be formed by dissolving the thermoplastic polymer into a solvent and precipitating it from the solution while providing sufficient agitation or introduction of a blowing agent (e.g., chemical or physical blowing agent). The use of air or any gaseous component of air may be used.

Illustratively, the foam may be made by dissolving a thermoplastic polymer in a solvent by heating. Typically, the heating is above 50° C. to below the onset melt temperature of the thermoplastic polymer to form a solution comprised of the dissolved thermoplastic polymer. Typically, the solvent is heated to a temperature above 100° C. to a temperature below the onset melt temperature of the particular thermoplastic polymer, which is determined by differential scanning calorimetry (DSC) as described herein. Illustratively, the solvent is heated above, 75° C., or 100° C. to 5%, 10% or 20% below the onset melt temperature of the thermoplastic polymer with examples being at most about 200° C., 180° C., 170° C. or 160° C.

The time at the maximum heating temperature (dissolution temperature) is any that realizes the desired dissolution of the thermoplastic polymer (typical is from 3 or 4 minutes to 3 or 4 hours). More than one elevated temperature may be used (held) during the process. For example, a higher temperature may be used to dissolve the thermoplastic polymer (dissolution temperature) and a lower temperature when precipitating the thermoplastic polymer (precipitation temperature). The precipitation temperature is the temperature where the thermoplastic polymer begins to precipitate upon cooling or the temperature where precipitation is induced by addition of a non-solvent. The precipitation temperature may be any that is useful from and above ambient ~20° C. to the dissolution temperature (when precipitating by addition of a non-solvent), to a temperature below the dissolution temperature (e.g., to 130° C., 125° C., 100° C., 75° C., or 50° C.). The precipitation temperature desirably is below the temperature where the nonsolvent begins to boil (onset boiling temperature as determined by DSC in like manner as the melt peak is determined herein). Agitation may be used during any portion or the entire process and the shear varied depending on the desired foam properties at different stages of the process.

Agitation is as commonly understood in which stirring the components in a liquid or slurried mixture under conditions in which shear forces are generated, creating patterns of flow and turbulence, generally using an impeller that rotates inside a stator. The stirring may be any useful to realize a shear rate that results in the formation of the foam or porous body. Once the impeller has drawn mixture in, it subjects the mixture to sudden changes of direction and acceleration such that the mixture contacts the wall of the stator with centrifugal force or is forced through the holes in the stator under pressure and speed, in a final change of direction and acceleration, which may induce frothing and incorporation of air.

Any suitable method of agitation may be used such as those known in the art, including, for example, the use of impellers, magnetic stirrers, homogenizers, colloid mills, ultrasonic agitation, cavitation and the like to realize the desired shear. Examples of useful agitation may be realized by any commercially available mixers.

Desirably, the atmosphere is any, where the solvent and other chemicals do not deleteriously react with the atmosphere. Typically, the dissolution is carried out at applied pressures at or near ambient pressures (e.g, ±10%, ±1% or ±0.1% of atmospheric pressure) in a closed vessel to minimize volatilization losses. The use of elevated pressures may be used and depending on the particular solvents used may be desirable and necessary (e.g., use of supercritical carbon dioxide). Exemplary atmospheres, depending on the solvent may include nitrogen or noble gases (e.g., argon) or combination thereof or air (e.g., dry air and any component in air individually or in combination).

The amount of thermoplastic polymer dissolved in the solvent may be any useful amount that may then be precipitated from the solution upon cooling, introducing a nonsolvent or combination thereof. Illustratively, the amount of thermoplastic polymer that is dissolved may be from 1%, 5%, 10% to any practical amount (not gelled), 50%, 40%, 30% or 25% by weight.

The solvent may be any useful solvent for dissolving the thermoplastic polymer such as polar aprotic solvents. Typically, the solvent has a volatility or low viscosity that allows for the ease of removal in subsequent processing steps such as separating the precipitated thermoplastic polymer from the solvent. Typically, the solvent has a viscosity within an order of magnitude of the viscosity of water at ambient conditions (e.g., ~1 centipoise @ about 20° C. to 25° C. and 1 atmosphere of pressure) or like viscosity at the temperature and pressure of dilution (e.g., supercritical fluid). That is the viscosity is typically less than 10 centipoise to 0.1 centipoise (cp) at the dissolution temperature. The volatility likewise as measured by the boiling point (or range) at 1 atmosphere of pressure is typically from about 30° C., 50° C. or 75° C. to 150° C., 200° C. or 250° C. The solvent typically has a molecular weight (weight average Mw) of Mw of at most about 500 g/moles, 200 g/moles, or even 150 g/moles to at least about 30 g/moles. It is understood, that in some instances, the solvent may be a solid at ambient conditions, but has the aforementioned boiling temperature and useful viscosity at an elevated temperature (e.g., less than about 100 cp or 10 cp), where the dissolution is carried out. Likewise, the solvent may be gaseous at ambient conditions and a liquid at the dissolution temperature and pressure.

The solvent may be a mixture of solvents. As an illustration the solvent may be mixture of a liquid solvent at room temperature and another solvent that is a solid at room temperature that dissolves in the liquid solvent, where the dissolved solvent imparts one or more desirable characteristic (e.g., improved solubility of the thermoplastic polymer or particle formation when using a non-solvent to precipitate the polymer from solution).

Exemplary solvents those described in paragraphs 26 to 34 of copending U.S. Pat. Appl. filed on the same day as the application by T. Fry and J. Eue et. al., and having a title of Polyketone Powder for Laser Sintering, incorporated herein by reference. The method may also be performed in a supercritical fluid such as carbon dioxide as described in 63/289,465 at temperatures, concentrations and pressures to dissolve in the carbon dioxide or other solvent previously described whereby the precipitation occurs by addition of the non-solvent be it the carbon dioxide or other solvent. The agitation may be modified during the precipitation to facilitate the formation and clustering of particles in the desired foam. For example, the shear may be high during the initial injection of the non-solvent during the nucleation of precipitate particles, then lower to facilitate clustering of the initial precipitated particles and then raised again to realize the desired foam porosity and structure.

The non-solvent used to induce the precipitation at the precipitation temperature may be any suitable based upon the solvent and the thermoplastic polymer used. Illustratively, the solvent may be NMP, DMPU, PGMEA or HMPA and the non-solvent may be a protic solvent such as water, a low molecular weight alcohol (e.g., C1 to C4 alcohol) or mixtures thereof when precipitating an aliphatic polyketone. The amount of non-solvent may be any necessary to cause the precipitation at a given precipitation temperature with that amount being any useful for realizing a desired precipitated thermoplastic polymer particle size, size distribution and morphology. Typically, concentrations of the non-solvent added may be 0.1%, 1%, 5% or 10% to typically 75%, 50% or 25% by volume of the solvent and non-solvent.

The foam may be made by a phase inversion process for forming foam/porous bodies. Typically, a phase inversion method comprises dissolving the thermoplastic polymer in a solvent to form a dope, contacting the dope with an amount antisolvent sufficient to phase invert the solvent and antisolvent and removing antisolvent to form the foam. The dope may have characteristics of a paste that allows for the continuous formation of a foam, for example, by forming an extrudate of the dope and plunging it through a non-solvent such as is common when forming gas-separation membranes as described for making polyimide membranes (e.g., U.S. Pat. Publ. No. 2015/0011815). The phase inversion may be carried out using liquid or supercritical carbon dioxide such as described in *Tissue Engineering*, Part B, Vol. 19, Number 3, 2013.

The foam may be made by an extrusion of a polymer having a chemical or physical foaming agent therein that causes foaming upon exiting a die. The volatile liquid or gas may be carbon dioxide. Exemplary methods are described in U.S. Pat. Nos. 4,824,720 and 6,284,810 and U.S. Pat. Publ. Nos. 2017/0282430 and 2005/0276967, each incorporated herein by reference. In some instances, the thermoplastic polymer powder has been found to have a morphology that leads to improved flow without the use of flow aids. Desirably, the polyketone has a sphericity sufficient to realize the necessary unaided flow. In terms of particle shape, and in particular particle roundness, which aids in flowability, and as derived from micrograph images of individual particles, may be expressed in terms of circular character, or circularity, where individual particle circularity is defined as the $4\pi A/P^2$, where A is the area of the particle and P is the perimeter length of the particle, both as viewed from a random perspective. Sphericity, a related parameter, is derived as the square root of circularity. Circularity is a numerical value greater than zero and less than or equal to one. A perfectly circular particle is referred to as having a circularity of 1.00. Tables of population circularity data are represented in such a way that various levels of circularity (e.g., 0.65, 0.75, 0.85, 0.90, and 0.95) are accompanied by percentages of the particle sample population with a circularity greater than the tabulated value. The circularity is determined at a solidity filter level of 0.9 or 0.95. Solidity filter is a filter used to remove overlapping particles in a 2 dimensional micrograph available in commercial image analysis software. Solidity in essence is the area of a particle over the area (particle area) of an area defined by the major and minor axis of the particle area of a 2 dimensional micrograph. Particle size and shape can be measured by any suitable methods known in the art to measure particle size by diameter. In some embodiments, the particle size and shape are determined by laser diffraction as is known in the art. For example, particle size can be determined using a laser diffractometer such as the Microtrac S3500 with static image analysis accessory using PartAnSI software to analyze the captured images of the particles. Desirably, at least about 65%, 70%, 80%, 95% or 99% of the particles (by number) have a circularity is at least about 0.8, 0.85, 0.9 or 0.95 for the powders separated and classified from the reactor without further treatment other than purification.

Likewise, the method may allow for the formation of useful powder without the use of further classifying or separation of undesirably small or large particles. Illustratively, the thermoplastic polymer powder generally has a particle size and size distribution that is useful for making additive manufactured articles and typically have an average or median particle size ($D_{50}$), by volume, from about 1 micrometer (μm), 10 μm, 20 μm, 30 μm or 40 μm to 150 μm, 125 μm, 110 μm or 100 μm. Likewise, to enable consistent heating and fusion of the powder, the powder desirably has a $D_{90}$ of at most 300 μm, 200 μm or 150 μm. To aid in flowability the thermoplastic polymer powder desirably has a $D_{10}$ of at least 0.1 μm, 0.5 μm or 1 μm by volume. $D_{90}$ means the particle size (equivalent spherical diameter) in the particle size distribution, where 90% by volume of the particles are less than or equal to that size; similarly, D50 means the particle size (equivalent spherical diameter) in the particle size distribution, where at least 50% by volume of the particles are less than that size, and $D_{10}$ means the particle size (equivalent spherical diameter) in the particle size distribution, where at least 10% by volume of the particles are less than that size. The particle size may be determined by any suitable method such as those known in the art including, for example, laser diffraction or image analysis of micrographs of a sufficient number of particles (~100 to ~200 particles). A representative laser diffractometer is one produced by Microtrac such as the Microtrac S3500.

EXAMPLES

Example 1

Polyketone powder is made by a process in the manner described in U.S. Pat. No. 5,138,032 from col. 2 line 52 to col. 5, line 17. The flakes have a % theoretical density of about 90 to 99%. The polyketone has a glass transition temperature of about 27° C.

The thermoplastic foams are milled using counter rotating pin mill run at 75% of maximum and gravity fed into the mill with a slight vacuum at the center discharge outlet into an air classifier with an air flow of 1700 m³/h and classification speed of 1100 rpm. The foam and apparatus are cooled to −35° C. and maintained at that temperature for the duration the foam is being milled. The average feed rate is 97.5 kg/hour. The average product discharge rate is 77 kg/hour with the oversized recycled back to the mill. The product has 98.5% of the particles by mass of less than 106 micrometers. The effective product throughput based upon an upper limit of size being less than 106 micrometer is 75.89 kg/hour.

Comparative Example 1

Polyketone extruded pellets made the same way as described in Example 1 are comminuted in the same way except as follows. The feed pellets are essentially dense and are generally about 2 mm diameter by 2 mm long pellets. The pellets are cooled to −40° C. The feed rate is 28.5 kg/hour. The feed is reduced because of the larger amount of recycled oversized material that is generated. The average discharge rate is 22 kg/hour. The product has about 34.8% of particles by mass of less than 106 micrometers. The effective product throughout based upon the particle size of the product less than 106 micrometers of about 7.6 kg/hour. From this, it is readily apparent that even at a lower feed rate, the powder that is produced is not as effectively milled to the desired size. That is, the use of a thermoplastic polymer foam of the present invention is more than 10 times efficient in realizing desirable thermoplastic polymer powders useful for additive manufacturing.

Example 2

Figure 1:
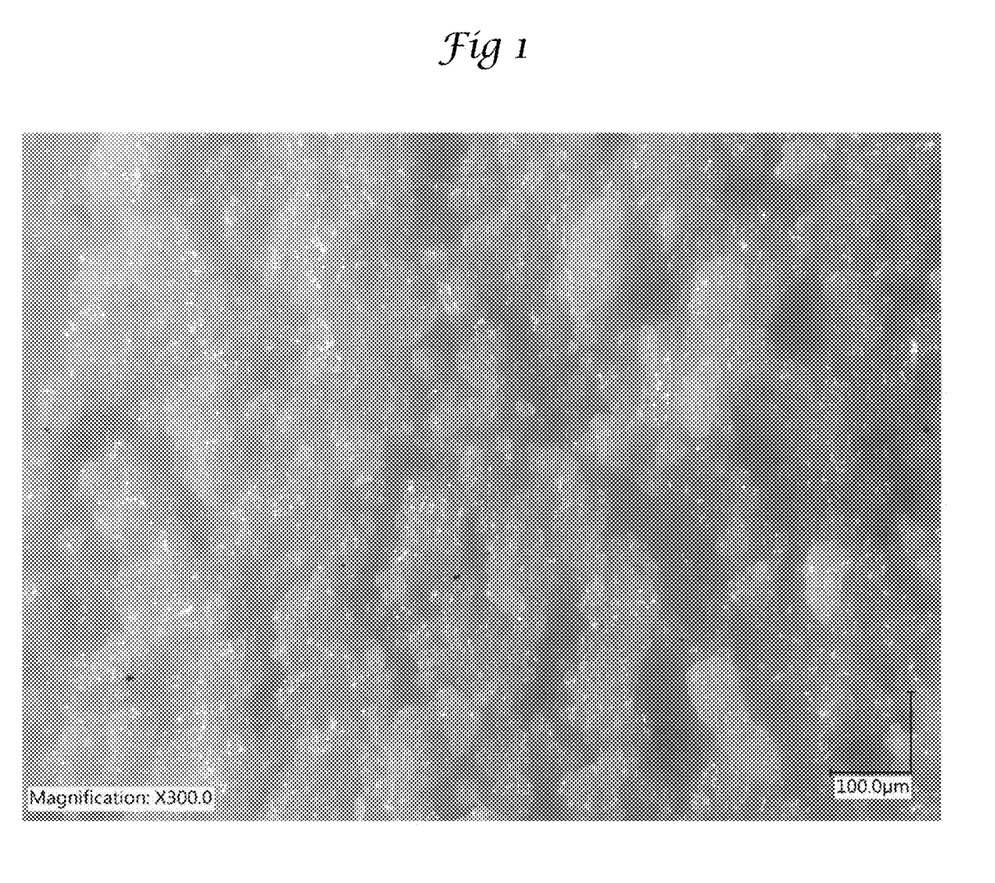
FIG. 1 is a 300× optical micrograph of a surface of a foam useful in the method of the invention.
Figure 2:
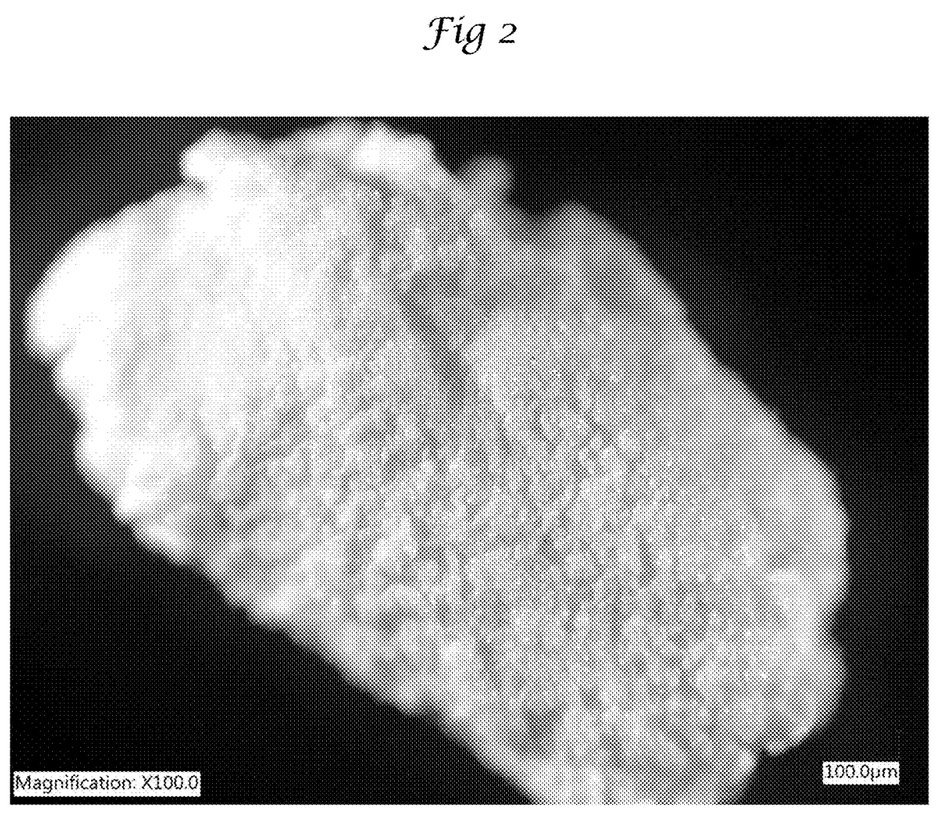
FIG. 2 is a 100× optical micrograph of a surface of a foam useful in the method of the invention.
Figure 3:
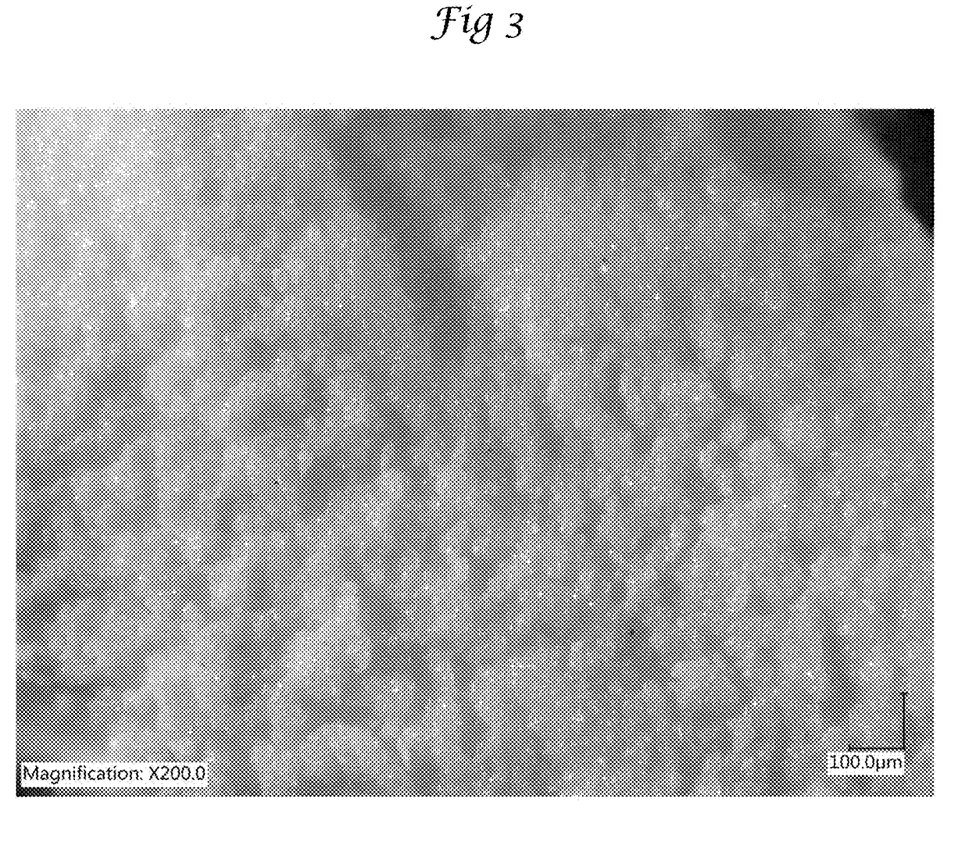
FIG. 3 is 200× optical micrograph of a surface of a foam useful in the method of the invention.
Figure 4:
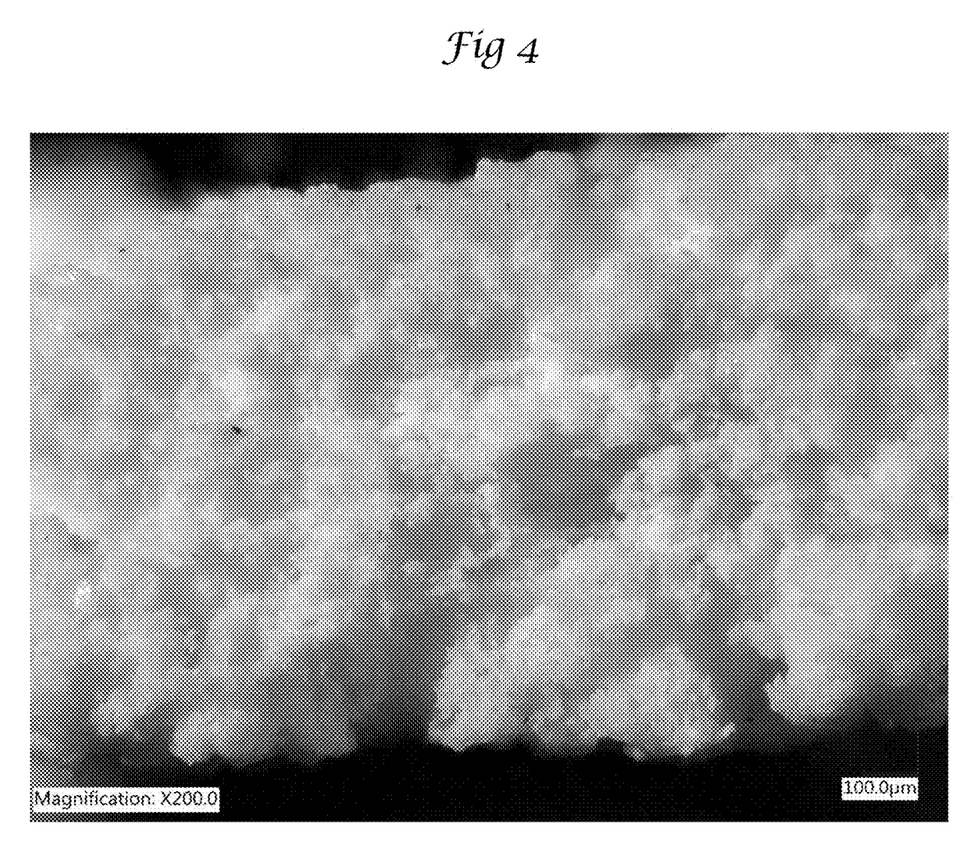
FIG. 4 is a 200× optical micrograph of the cross-section of a foam useful in the method of the invention.

A polyetherketoneketone (PEKK) foam is milled in a counter rotating pin mill in a similar fashion as Example 1, but at a temperature in the range from 0° C. to within 20% of the brittleness temperature of the PEKK. The foam is shown in FIGS. 1-4. The typical size of the foam is about 100 micrometer to 3 mm thick irregular flakes. The average strut size is about 82 micrometers. From the Figures, it is readily apparent that there is significant porosity of at least 10% (i.e., less than about 90% theoretical density). The foam milled quickly and in like manner as Example 1 with high efficiency and desired particle size without significant oversized material. The polyetherketoneketone has a Tg of about 160° C., melt temperature of about 305° C., and a T:I ratio of about 60:40.

What is claimed is:

1. A method comprising,
   (i) cooling a foam comprised of a thermoplastic polymer having a glass transition temperature to a cooling temperature below the glass transition temperature, wherein the foam has an average strut dimension of 10 to 500 micrometers and an average cell size that is less than the average strut dimension to form a cooled foam, and
   (ii) comminuting the cooled foam to form a thermoplastic polymer powder.

2. The method of claim 1, wherein the foam has a porosity of 2% to 50%.

3. The method of claim 2, wherein the foam has a porosity of at most 40%.

4. The method of claim 1, wherein the foam the average strut dimension is 20 to 300 micrometers.

5. The method of claim 1, wherein the foam has a $D_{10}$ strut dimension of at least 10 micrometers.

6. The method of claim 5, wherein the foam has a $D_{90}$ strut dimension of at most 500 micrometers.

7. The method of claim 1, wherein the average cell size is at least 10% less than the average strut dimension.

8. The method of claim 7, wherein the average cell size is at least 20% less than the average strut dimension.

9. A method comprising,
   (i) cooling a foam comprised of a thermoplastic polymer having a glass transition temperature to a cooling temperature below the glass transition temperature, wherein the foam has an average strut dimension of 10 to 500 micrometers to form a cooled foam, and
   (ii) comminuting the cooled foam to form a thermoplastic polymer powder, wherein the thermoplastic polymer powder has (i) a $D_{90}$ particle size of less than about 150 μm, (ii) a $D_{10}$ of at least 10 μm and (iii) an average particle size of about 20 μm to about 150 μm and at least 80% by number of the the thermoplastic polymer powder has a circularity of at least about 0.8.

10. The method of claim 9, wherein at least 80% by number of the thermoplastic polymer powder has a circularity of at least about 0.85.

11. The method of claim 1, wherein the thermoplastic polymer powder has a flow rate of at least 0.5 g/s using a 15 mm nozzle as per Method A of ASTM-D.

12. The method of claim 1, wherein the foam has an average size from 0.5 mm to 50 mm equivalent spherical diameter.

13. A method comprising,
   (i) cooling a foam comprised of a thermoplastic polymer having a glass transition temperature to a cooling temperature below the glass transition temperature, wherein the foam has an average strut dimension of 10 to 500 micrometers to form a cooled foam, and
   (ii) comminuting the cooled foam to form a thermoplastic polymer powder, wherein the foam is formed by a process comprising one of the following:
   a first method comprising: incorporating a blowing agent into a thermoplastic polymer under temperature and pressure where the thermoplastic polymer is molten, and reducing the pressure sufficiently to cause the blowing agent to become gaseous forming the foam;
   a second method comprising: dissolving the thermoplastic polymer in a solvent to form a dope, contacting the dope with an amount antisolvent sufficient to phase invert the solvent and anti-solvent and removing antisolvent to form the foam; and a third method comprising: dissolving the thermoplastic polymer in a solvent to form a solution, precipitating the thermoplastic polymer by addition of a nonsolvent to form precipitated thermoplastic polymer particles, coalescing the precipitated thermoplastic polymer particles to form a particulate foam slurry, and removing the solvent and non-solvent to form the foam.

14. The method of claim 1, wherein the foam is formed by the polymerization of the thermoplastic polymer and precipitating it from a reaction medium.

15. The method of claim 13, wherein the blowing agent is comprised of one or more of a chemical blowing agent and physical blowing agent.

16. The method of claim 15, wherein the blowing agent is comprised of supercritical carbon dioxide.

17. A method comprising,
 (i) cooling a foam comprised of a thermoplastic polymer having a glass transition temperature to a cooling temperature below the glass transition temperature, wherein the foam has an average strut dimension of 10 to 500 micrometers to form a cooled foam and the thermoplastic polymer has a brittleness temperature and the cooling temperature is below the glass transition temperature of the thermoplastic polymer and above the brittleness temperature, and
 (ii) comminuting the cooled foam to form a thermoplastic polymer powder.

18. The method of claim 17, wherein the cooling temperature is within 20% of the glass transition temperature and within 20% of the brittleness temperature.

19. The method of claim 17, wherein the cooling temperature is within 20% of the brittleness temperature.

20. The method of claim 17, wherein the cooling temperature is within 20% of the glass transition temperature.

* * * * *